United States Patent
Sung et al.

(10) Patent No.: US 12,230,222 B2
(45) Date of Patent: Feb. 18, 2025

(54) ELECTRONIC DEVICE

(71) Applicants: Innolux Corporation, Miaoli County (TW); CARUX TECHNOLOGY PTE. LTD., Singapore (SG)

(72) Inventors: Li-Wei Sung, Tainan (TW); Chia-Hsien Lin, Miaoli County (TW); Cheng-Wu Lin, Miaoli County (TW); Yu-Ming Wu, Miaoli County (TW)

(73) Assignees: Innolux Corporation, Miaoli County (TW); CARUX TECHNOLOGY PTE. LTD., Singapore (SG)

( * ) Notice: Subject to any disclaimer, the term of this patent is extended or adjusted under 35 U.S.C. 154(b) by 0 days.

(21) Appl. No.: 18/366,700

(22) Filed: Aug. 8, 2023

(65) Prior Publication Data
US 2024/0078979 A1    Mar. 7, 2024

Related U.S. Application Data

(60) Provisional application No. 63/403,865, filed on Sep. 6, 2022.

(30) Foreign Application Priority Data

Jun. 7, 2023   (CN) .......................... 202310670381.3

(51) Int. Cl.
*G09G 3/34*      (2006.01)
*B60K 35/00*     (2024.01)
(Continued)

(52) U.S. Cl.
CPC ............ *G09G 3/3406* (2013.01); *B60K 35/00* (2013.01); *B60K 35/22* (2024.01); *B60K 35/81* (2024.01);
(Continued)

(58) Field of Classification Search
CPC ......... G09G 3/3406; G09G 2320/0686; G09G 2358/00; G09G 2380/10; G09G 2380/12;
(Continued)

(56) References Cited

U.S. PATENT DOCUMENTS 8,797,254 B2 *  8/2014  Uchibe ................ G09G 3/3426
                                                        345/102
8,955,147 B2    2/2015  Lee et al.
(Continued)

FOREIGN PATENT DOCUMENTS

CN          112885237         6/2021
CN          214587961         11/2021

OTHER PUBLICATIONS

"Office Action of Taiwan Counterpart Application", issued on Jun. 6, 2024, p. 1-p. 6.
(Continued)

*Primary Examiner* — Douglas M Wilson
(74) *Attorney, Agent, or Firm* — JCIPRNET (57) ABSTRACT

An electronic device including a display device is provided. The display device includes a sharing area, a junction area, and a privacy area. The junction area is positioned between the sharing area and the privacy area. The display device includes a privacy panel. A transmittance of the privacy panel corresponding to the sharing area is greater than a transmittance of the privacy panel corresponding to the junction area, and the transmittance of the privacy panel corresponding to the junction area is greater than a transmittance of the privacy panel corresponding to the privacy area.

19 Claims, 11 Drawing Sheets

(51) Int. Cl.
*B60K 35/22* (2024.01)
*B60K 35/81* (2024.01)
*H04N 13/30* (2018.01)

(52) U.S. Cl.
CPC ...... *B60K 2360/349* (2024.01); *G09G 3/3426* (2013.01); *G09G 2320/028* (2013.01); *G09G 2320/068* (2013.01); *G09G 2320/0686* (2013.01); *G09G 2358/00* (2013.01); *G09G 2380/10* (2013.01); *G09G 2380/12* (2013.01); *H04N 2013/40* (2018.05)

(58) Field of Classification Search
CPC ....... G09G 2320/028; G09G 2320/068; G09G 3/3426; B60K 35/00; B60K 35/22; B60K 35/81; B60K 2360/349; H04N 2013/40
See application file for complete search history.

(56) References Cited

U.S. PATENT DOCUMENTS

| | | | |
|---|---|---|---|
| 2012/0098854 A1 | 4/2012 | Ohnishi | |
| 2021/0043151 A1* | 2/2021 | Nawata | G09G 3/3406 |
| 2021/0065620 A1* | 3/2021 | Yang | G09G 3/3208 |

OTHER PUBLICATIONS

"Office Action of Taiwan Counterpart Application", issued on Nov. 13, 2024, p. 1-p. 4.

* cited by examiner

ELECTRONIC DEVICE

CROSS-REFERENCE TO RELATED APPLICATION

This application claims the priority benefit of U.S. provisional application Ser. No. 63/403,865, filed on Sep. 6, 2022, and China application serial no. 202310670381.3, filed on Jun. 7, 2023. The entirety of the above-mentioned patent application is hereby incorporated by reference herein and made a part of this specification.

BACKGROUND

Technical Field

The disclosure relates to an electronic device with a privacy function.

Description of Related Art

The related display technology, whether using mode switching or a privacy panel, can generally only be used on an entire display panel, and most of them are only used in small panels. Moreover, in low-light environments (for example, in a car at night, in a dim indoor environment), the mode switching technology often has light leakage from a large viewing angle, resulting in poor privacy effect. In this case, to optimize the privacy effect, the overall brightness of the backlight module has to be reduced.

In addition, traditional displays that use privacy technology are all small and medium-sized and cannot activate the privacy function for "partial" areas. If a large-size display needs to have a partial privacy function, the current privacy display cannot meet this requirement.

SUMMARY

The disclosure is an electronic device, which has a partial privacy function, and the display device can achieve a high-quality optical performance.

According to an embodiment of the disclosure, the electronic device includes a display device. The display device includes a sharing area, a junction area, and a privacy area. The junction area is positioned between the sharing area and the privacy area. An area of the sharing area is larger than an area of the privacy area.

According to an embodiment of the disclosure, the electronic device includes a display device. The display device includes a sharing area, a junction area, and a privacy area. The junction area is positioned between the sharing area and the privacy area. A transmittance of the sharing area is greater than a transmittance of the junction area, and the transmittance of the junction area is greater than a transmittance of the privacy area.

DESCRIPTION OF THE EMBODIMENTS

The disclosure may be understood by referring to the following detailed description in conjunction with the accompanying drawings. It should be noted that, in order to make the readers easy to understand and for the sake of brevity of the drawings, several drawings in the disclosure only depict a part of an electronic device. Also, certain elements in the drawings are not drawn to actual scale. In addition, the quantity and size of each element in the drawings are only for illustration, and are not intended to limit the scope of the disclosure.

In the following description and claims, words such as "comprising" and "including" are open-ended words and should be interpreted as meaning "including but not limited to . . . ".

It should be understood that, although the terms first, second, third . . . may be used to describe various constituent elements, the constituent elements are not limited to this term. This term is only used to distinguish a single constituent element from other constituent elements in the specification. The same terms may not be used in the claims, but replaced by first, second, third . . . in accordance with the order in which the elements are declared in the claims. Therefore, in the following description, a first constituent element may be a second constituent element in the claims.

In some embodiments of the disclosure, terms related to bonding and connection, such as "connection" and "interconnection", unless otherwise specified, may mean that two structures are in direct contact, or may also mean that two structures are not in direct contact, in which there are other structures positioned between the two structures. Also, the terms related to bonding and connection may also include the situation that both structures are movable, or both structures are fixed. In addition, the term "coupled" includes any direct or indirect electrical connection method.

In the disclosure, the length, width, thickness, height or area, or the distance or pitch between elements may be measured by an optical microscope (OM), a scanning electron microscope (SEM), a thin film thickness profilometer (α-step), an ellipsometer, or other suitable method. In detail, according to some embodiments, an SEM may be used to obtain a cross-sectional structure image including the element to be measured, and measure the length, width, thickness, height or area of each element, or the distance or pitch between elements, but not limited thereto.

In addition, the terms "the given range is from the first value to the second value" and "the given range falls within the range from the first value to the second value" mean that the given range includes the first value, the second value, and other values in between. If the first direction is perpendicular to the second direction, the angle between the first direction and the second direction may be between 80 degrees and 100 degrees; if the first direction is parallel to the second direction, the angle between the first direction and the second direction may be between 0 degrees and 10 degrees. The terms "about", "equivalent", "equal" or "identical", "substantially" or "approximately" are generally interpreted as being within 20% of a given value or range, or interpreted as being within 10%, 5%, 3%, 2%, 1%, or 0.5% of a given value or range. Reference will now be made in detail to the exemplary embodiments of the disclosure, examples of which are illustrated in the accompanying drawings. Wherever possible, the same reference numerals will be used in the drawings and description to refer to the same or like parts.

Figure 1:
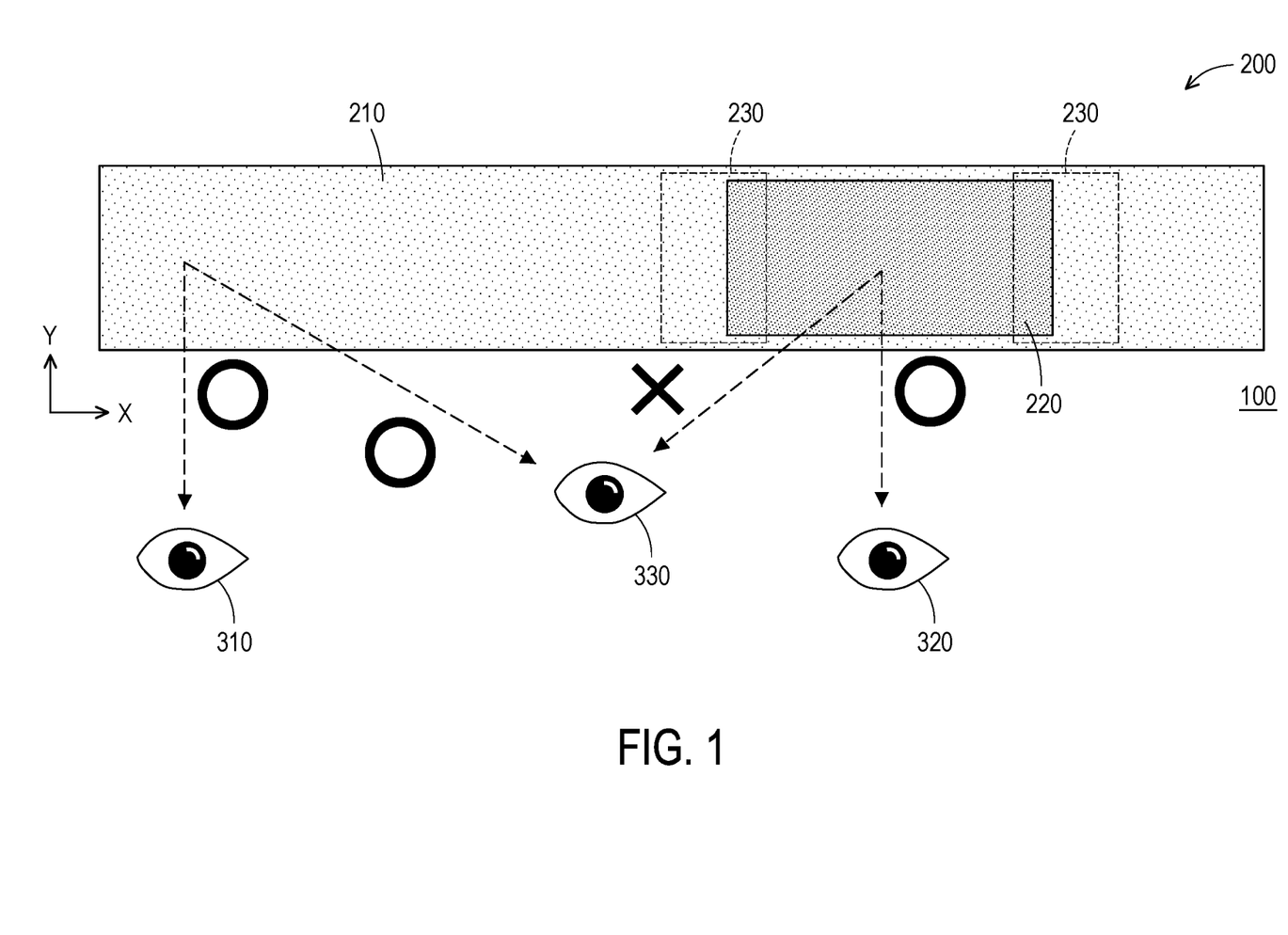
FIG. 1 shows a schematic diagram of an electronic device according to an embodiment of the disclosure.
Figure 2:
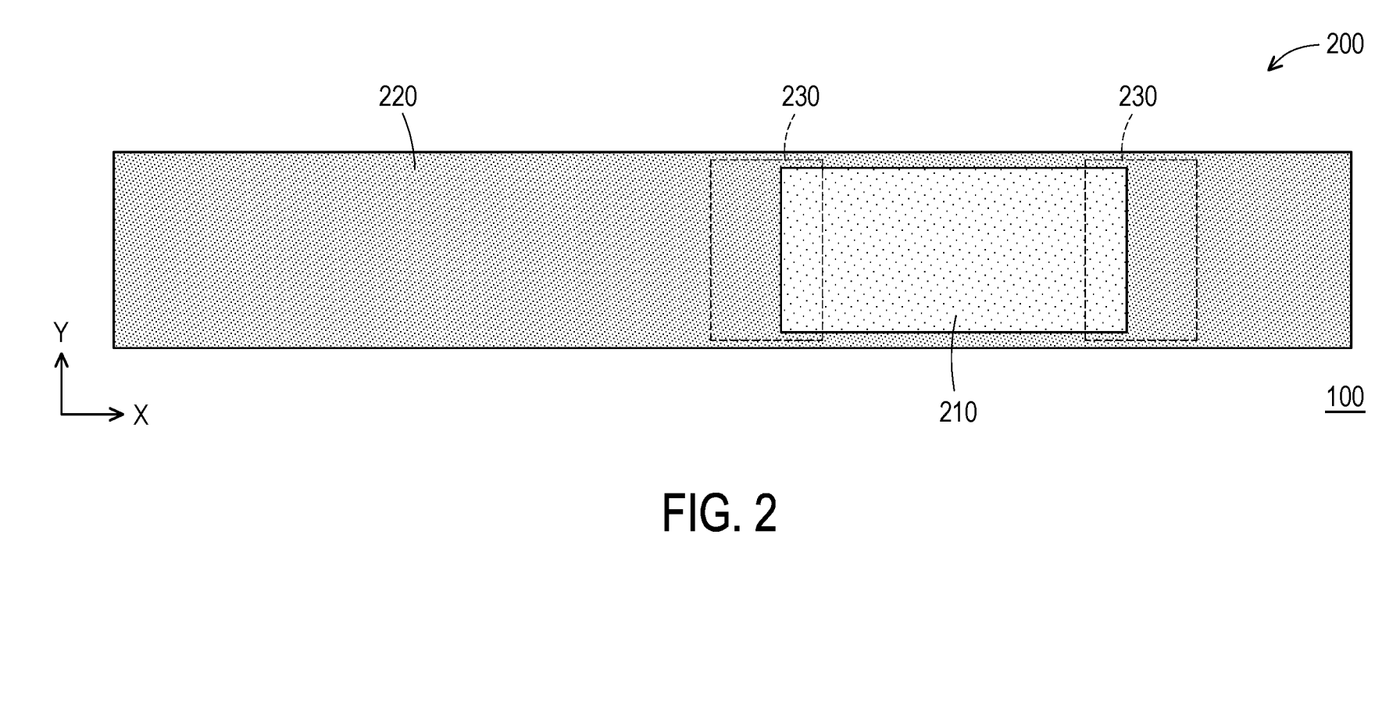
FIG. 2 shows a schematic diagram of an electronic device according to another embodiment of the disclosure.

FIG. 1 shows a schematic diagram of an electronic device according to an embodiment of the disclosure. Please refer to FIG. 1. An electronic device 100 includes a display device 200. The display device 200 includes a sharing area 210, a junction area 230, and a privacy area 220. The junction area 230 is positioned between the sharing area 210 and the privacy area 220. A part of the junction area 230 overlaps with the sharing area 210, and another part overlaps with the privacy area 220. A transmittance of the sharing area 210 is greater than a transmittance of the privacy area 220. In this embodiment, an area of the sharing area 210 is larger than an area of the privacy area 220, but the disclosure is not limited thereto. FIG. 2 shows a schematic diagram of an electronic device according to another embodiment of the disclosure. In the embodiment shown in FIG. 2, the area of the privacy area 220 of the display device 200 may also be designed as larger than the area of the sharing area 210.

Taking FIG. 1 as an example, the electronic device 100 can partially activate a privacy function and enable the display device 200 to achieve a high-quality optical performance. For example, when the privacy function is activated, a user at a position 310 may see the displayed content of the sharing area 210, a user at a position 320 may see the displayed content of the privacy area 220, a user at a position 330 may see the displayed content of the sharing area 210 but may not see the displayed content of the privacy area 220. In addition, in FIG. 1, the display device 200 does not have the poor quality of light and dark in the junction area 230 due to the halo blending of light-emitting elements, so that the display device 200 can achieve a high-quality optical performance.

Figure 3A:
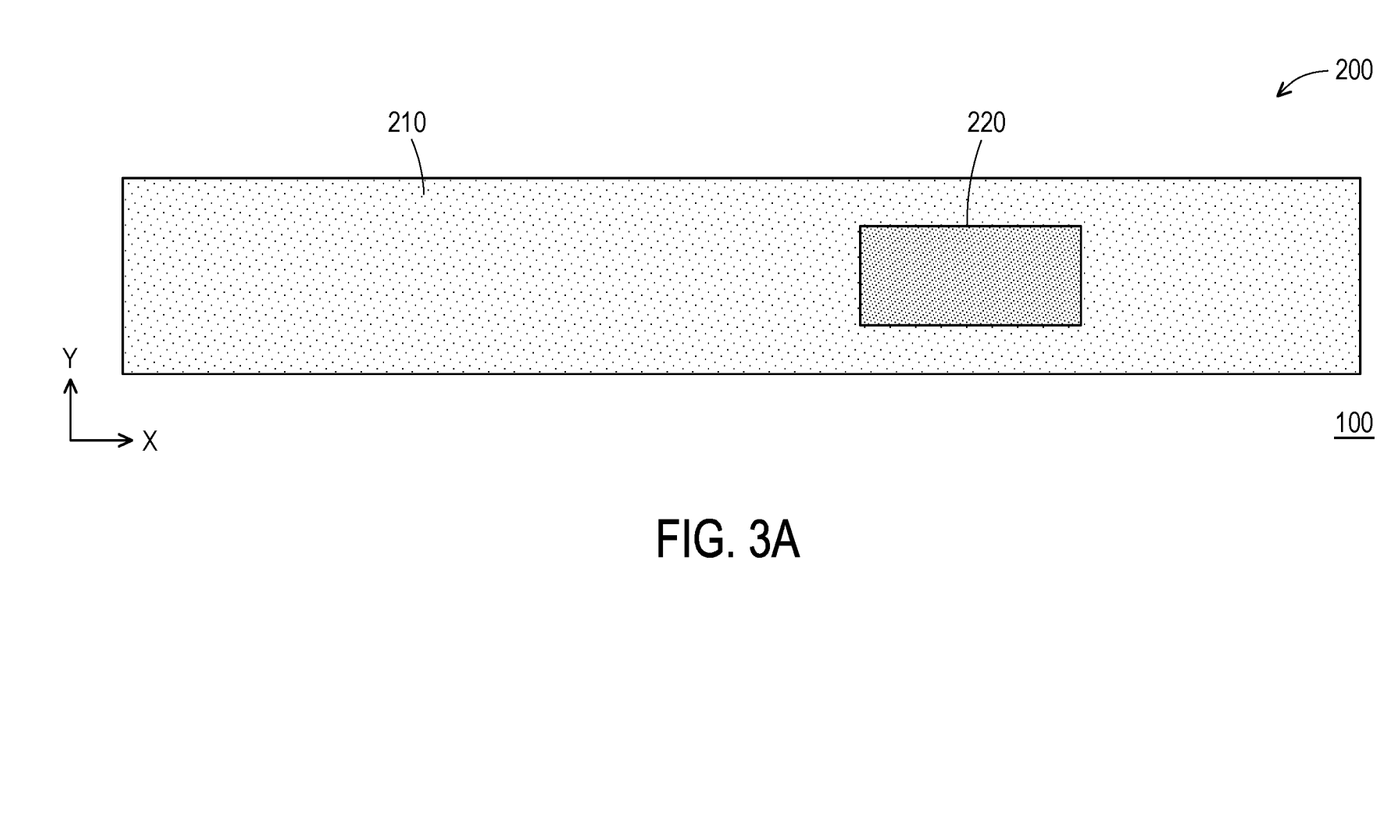
FIG. 3A, FIG. 3B, and FIG. 3C show schematic diagrams of electronic devices according to different embodiments of the disclosure.
Figure 3B:
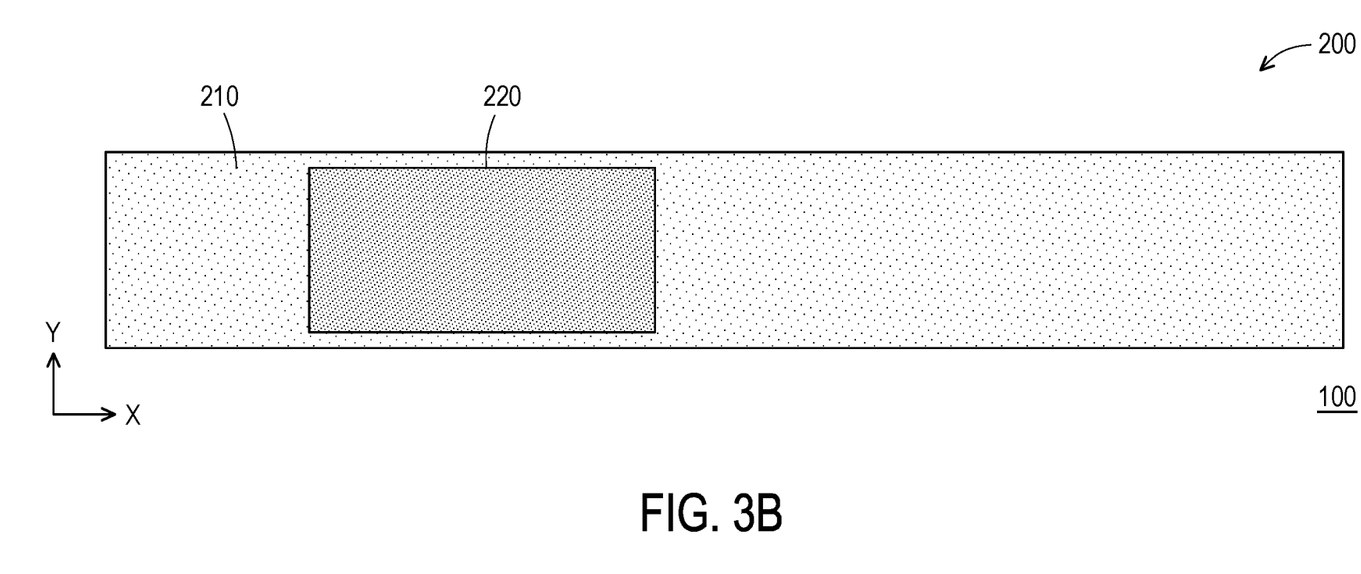
Figure 3C:
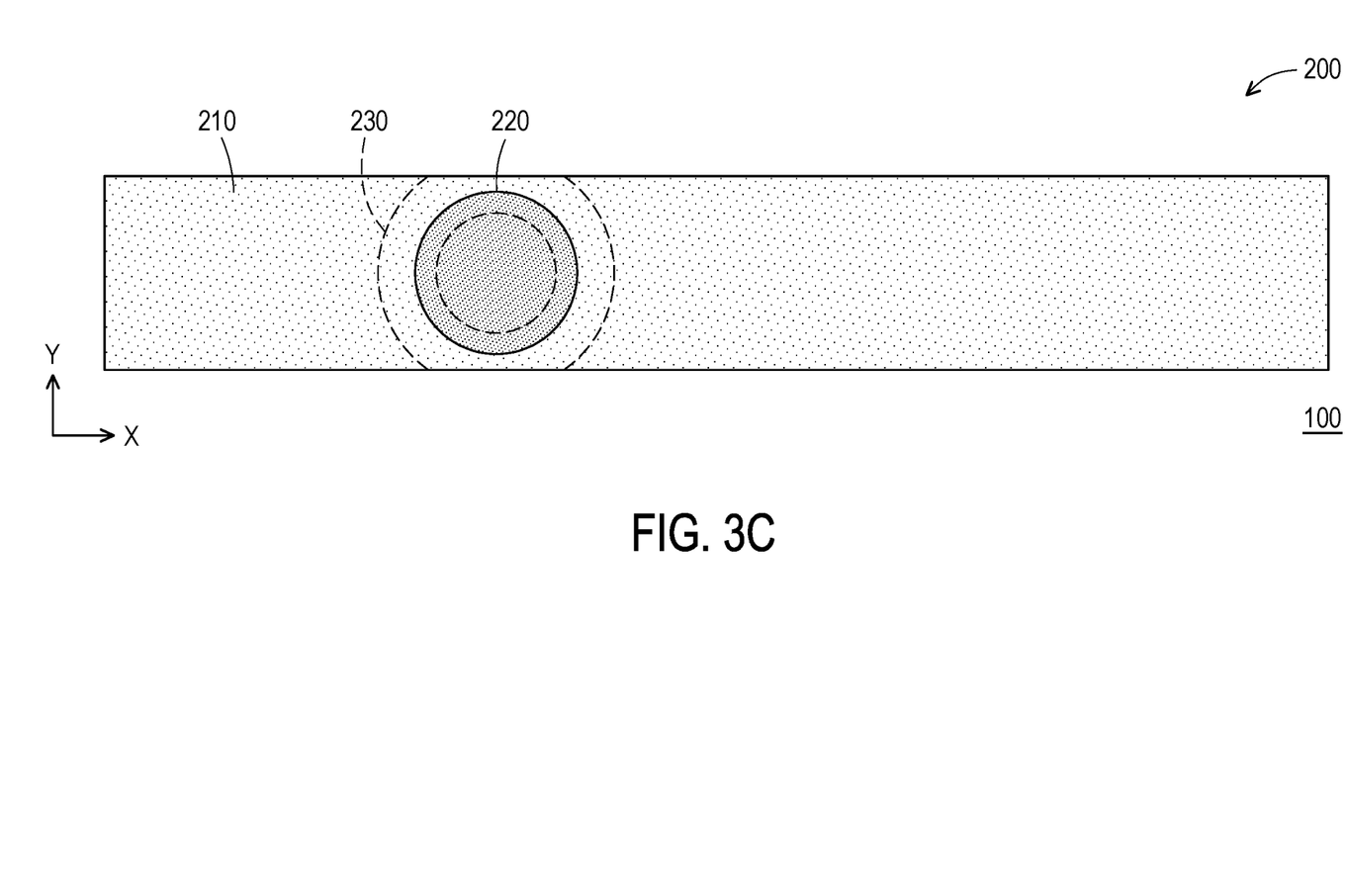

In the embodiment of the disclosure, the size, position, and shape of the privacy area 220 are not limited to as shown in FIG. 1 and FIG. 2. The privacy area 220 may be any area of the display device 200. The disclosure does not limit the size, position, or shape of the privacy area 220, which may be selected according to actual design requirements. For example, FIG. 3A, FIG. 3B, and FIG. 3C show schematic diagrams of electronic devices according to different embodiments of the disclosure. In the embodiment of FIG. 3A, the size of an area of the privacy area 220 in FIG. 3A is different from the privacy area 220 in FIG. 1. In the embodiment of FIG. 3B, the position of the privacy area 220 in FIG. 3B is different from the privacy area 220 in FIG. 1. In the embodiment of FIG. 3C, the size of the area, position, and shape of the privacy area 220 in FIG. 3C are all different from the privacy area 220 in FIG. 1. A selection method of the size of the area, position, and shape of the privacy area 220 can be realized through user input. For example, the user can adjust the size, position, or shape of the privacy area 220 through touch gestures or touch commands. In response to a change in the privacy area 220, the junction area 230 may also change accordingly.

In an embodiment of the disclosure, the display device 200 may be a display device for a carrier. The carrier may be an apparatus capable of carrying people, including a vehicle, an airplane, or a ship. Taking the vehicle as an example, the electronic device 100 is, for example, an electronic device of a vehicle cockpit system. Therefore, the display device 200 is a vehicle display that may receive a data signal and an image signal from devices including a vehicle machine or an electronic control unit (ECU) or the like to display dashboard information and image information respectively, but the disclosure is not limited to receiving signals from the vehicle machine or the ECU.

Taking FIG. 1 as an example, an application scenario of the disclosure is, for example, that the privacy area 220 is positioned in front of the passenger seat to display image information of a multimedia system, and a part of the sharing area 210 positioned in front of the driver is used to display dashboard information. In order to prevent the multimedia image information displayed in the privacy area 220 from affecting the concentration of the driver, the electronic device 100 can activate the privacy function of the privacy area 220 to prevent the driver from viewing the multimedia image information displayed in the privacy area 220.

Below, FIG. 1 is taken as an example to further illustrate the embodiment of the disclosure, but the size of the area, position, and shape of the privacy area of the disclosure are not limited to the embodiment in FIG. 1.

Figure 4:
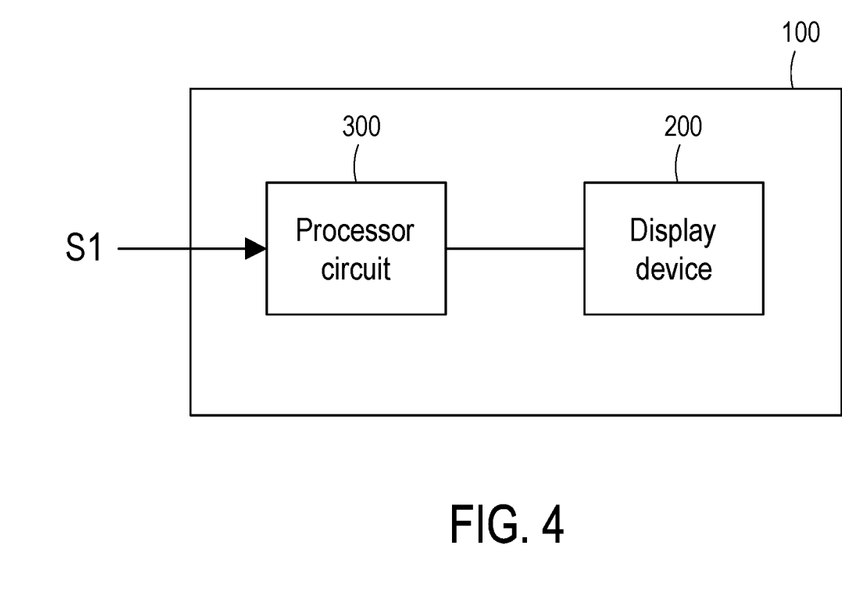
FIG. 4 shows a schematic diagram of an electronic device according to another embodiment of the disclosure.
Figure 5:
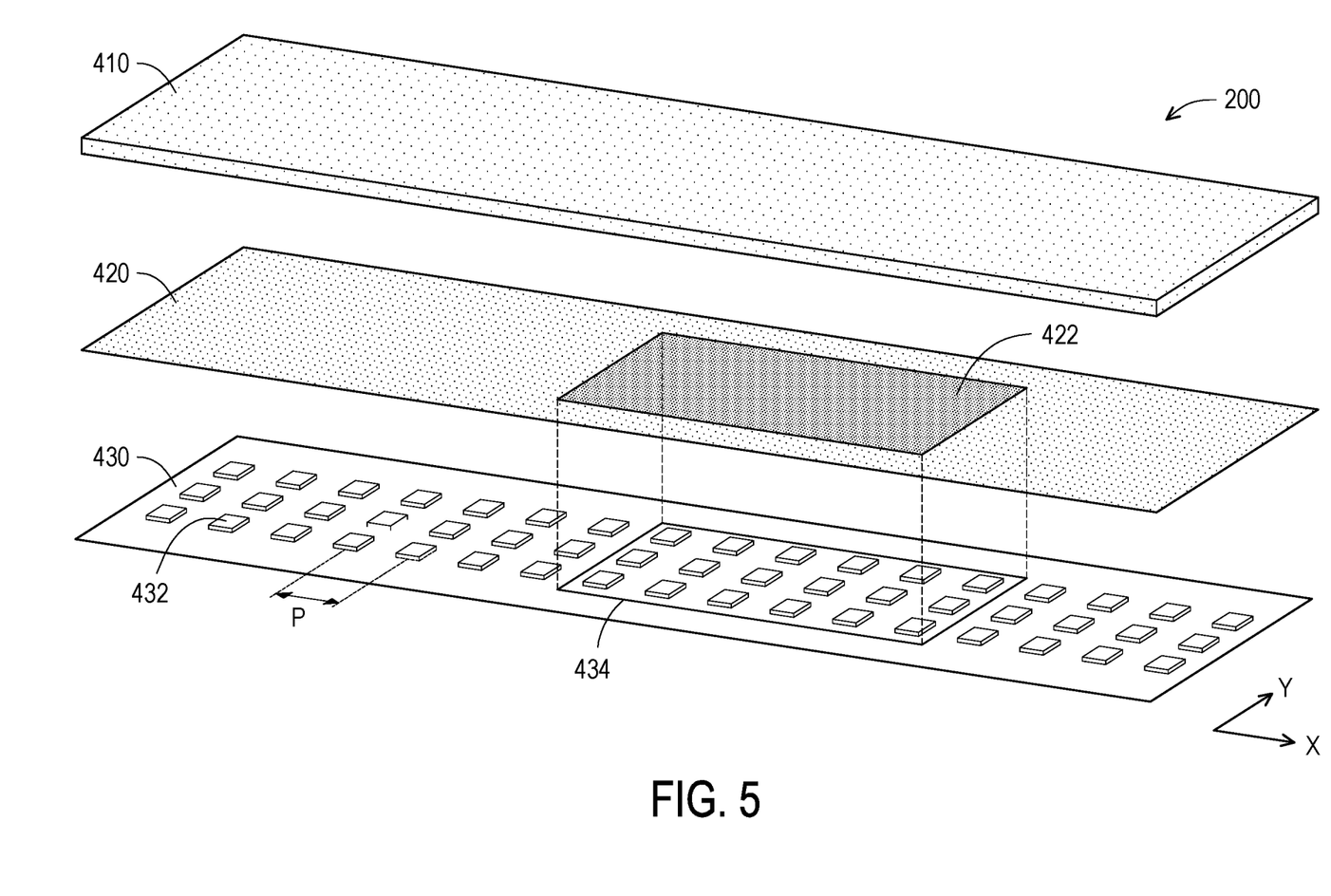
FIG. 5 shows a schematic exploded diagram of a display device in FIG. 4.

FIG. 4 shows a schematic diagram of an electronic device according to another embodiment of the disclosure. FIG. 5 shows a schematic exploded diagram of a display device in FIG. 4. Please refer to FIG. 1, FIG. 4 and FIG. 5. The electronic device 100 includes the display device 200 and a processor circuit 300. The display device 200 includes a display panel 410, a privacy panel 420, and a backlight module 430. The backlight module 430 includes a plurality of light-emitting elements 432. Pitches between the respective light-emitting elements 432 are P. The display device 200 displays an image according to raw content data S1. The processor circuit 300 may perform an image processing operation on the raw content data S1 to adjust the number of bits of the raw content data S1. For example, the processor circuit 300 may first increase the number of bits of the raw content data by interpolation or table lookup, for example, from 8 bits to 10 bits, so as to improve the fineness of the displayed image, and then in response to the activation of the privacy function, the processor circuit 300 further reduces the number of bits corresponding to data of the raw content of the privacy area 220.

In addition, the processor circuit 300 may partially change the position of a privacy area 422 of the privacy panel 420 to activate the privacy function. Alternatively, the processor circuit 300 can also correspondingly adjust the brightness of the light-emitting element 432 of a partial area 434 to activate the privacy function.

In this embodiment, the display device 200 may include a liquid crystal display, a self-luminous display, such as an organic light emitting diode (OLED) display, a submillimeter light emitting diode (mini LED) display, a micro light emitting diode (micro LED) display, or a quantum dot (QD, for example, QLED, QDLED) light-emitting diode display, fluorescence, phosphor, or other suitable materials, and the materials may be arranged in any combination, but is not limited thereto. The disclosure does not limit the type of the display device 200.

In this embodiment, the processor circuit 300 may include a controller or a processor, which is a circuit element having a computing capability. Alternatively, the controller or processor included in the processor circuit 114 may be designed by a hardware description language (HDL) or any other design method for digital circuits familiar to persons skilled in the art, and may be a hardware circuit implemented by a field programmable gate array (FPGA), a complex programmable logic device (CPLD), or an application-specific integrated circuit (ASIC).

Figure 6:
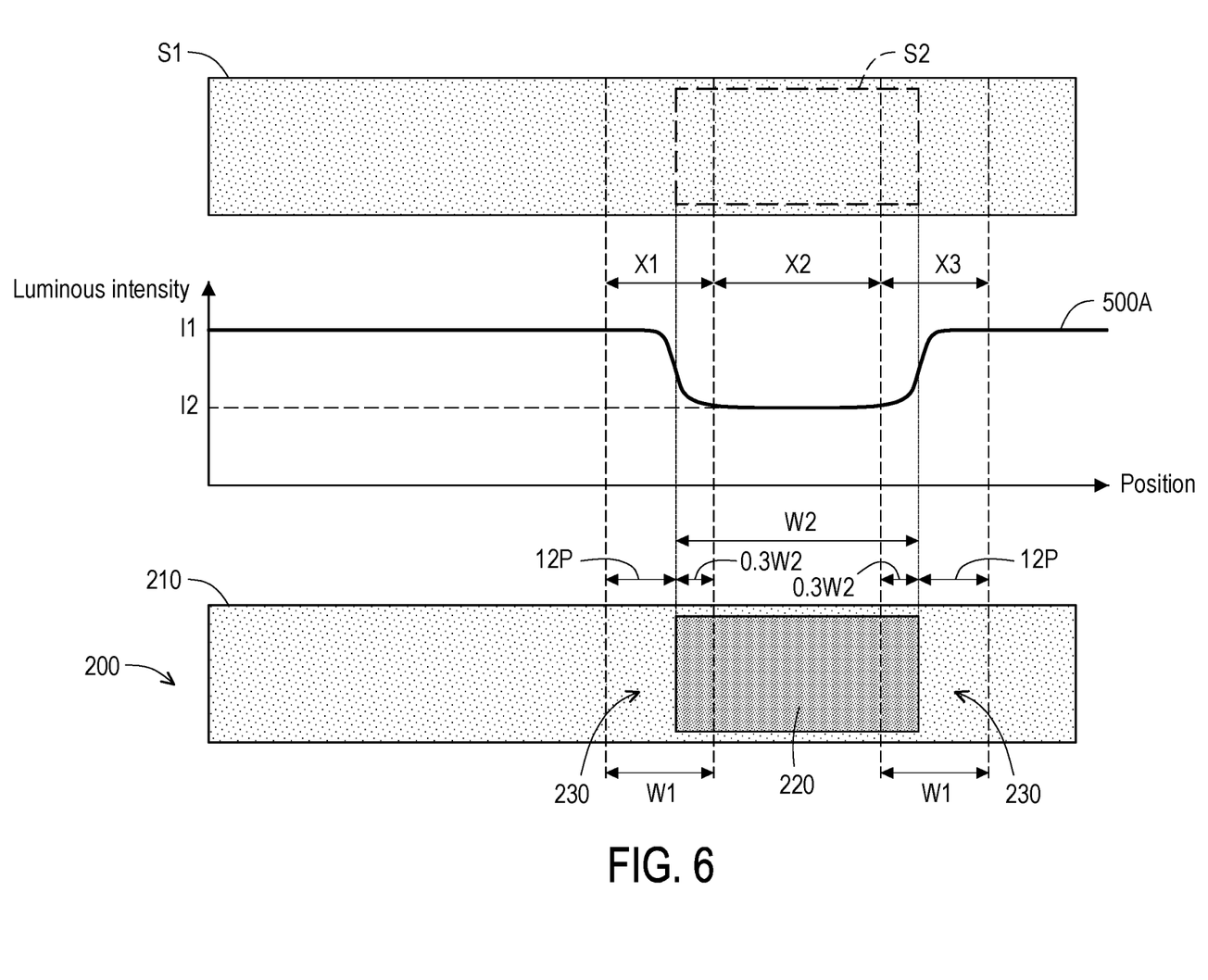
FIG. 6 shows a schematic distribution diagram of a light intensity of a backlight module according to an embodiment of the disclosure.

FIG. 6 shows a schematic distribution diagram of a light intensity of a backlight module according to an embodiment of the disclosure. Please refer to FIG. 1, FIG. 5 and FIG. 6. In FIG. 6, S1 is the raw content data to be displayed on the display device 200, such as screen data input by the user and desired to be displayed, in which the raw content data S1 includes data S2 to be displayed in the privacy area 220. The display device 200 is controlled by the processor circuit 300 and may display an image frame according to the raw content data S1. On the other hand, a curve 500A is a distribution of a light intensity of the backlight module 430 at different positions in an X direction, in which the abscissa is the position in the X direction, and the ordinate is the light intensity of the light-emitting element 432.

In this embodiment, the processor circuit 300, for example, correspondingly adjusts the brightness of the light-emitting element 432 of the partial area 434 to realize the privacy function. Through the adjustment of the processor circuit 300, a luminous intensity I1 of the backlight module 430 corresponding to the sharing area 210 is greater than a luminous intensity I2 of the backlight module 430 corresponding to the privacy area 220. In addition, a luminous intensity of the backlight module 430 corresponding to the junction area 230 is from the luminous intensity I1 to the luminous intensity I2. For example, in a position range X1, the luminous intensity of the backlight module 430 changes gradually from the luminous intensity I1 to the luminous intensity I2. In a position range X2, the luminous intensity of the backlight module 430 is maintained at the luminous intensity I2. Next, in a position range X3, the luminous intensity of the backlight module 430 changes gradually from the luminous intensity I2 to the luminous intensity I1. That is to say, the processor circuit 300 may adjust the overall brightness of the light-emitting element 432 in a specific area (such as the partial area 434 in FIG. 5) to realize the privacy function. The unit of the luminous intensity may be represented by an arbitrary unit (A.U.).

In this embodiment, a width of the junction area 230 is W1, which meets a condition of 12P+0.3W2, in which P is a pitch of the light-emitting elements 432, and W2 is a width of the privacy area 220. The unit of the widths W1, W2 and the pitch P is millimeter (mm).

FIG. 6 shows a schematic distribution diagram of the light intensity of the backlight module 430 in the X direction when the area of the sharing area 210 is larger than the area of the privacy area 220 (as shown in FIG. 1), through modulating the brightness of the light-emitting elements 432 of the partial area 434 of the backlight module 430, the privacy function is realized.

Figure 7:
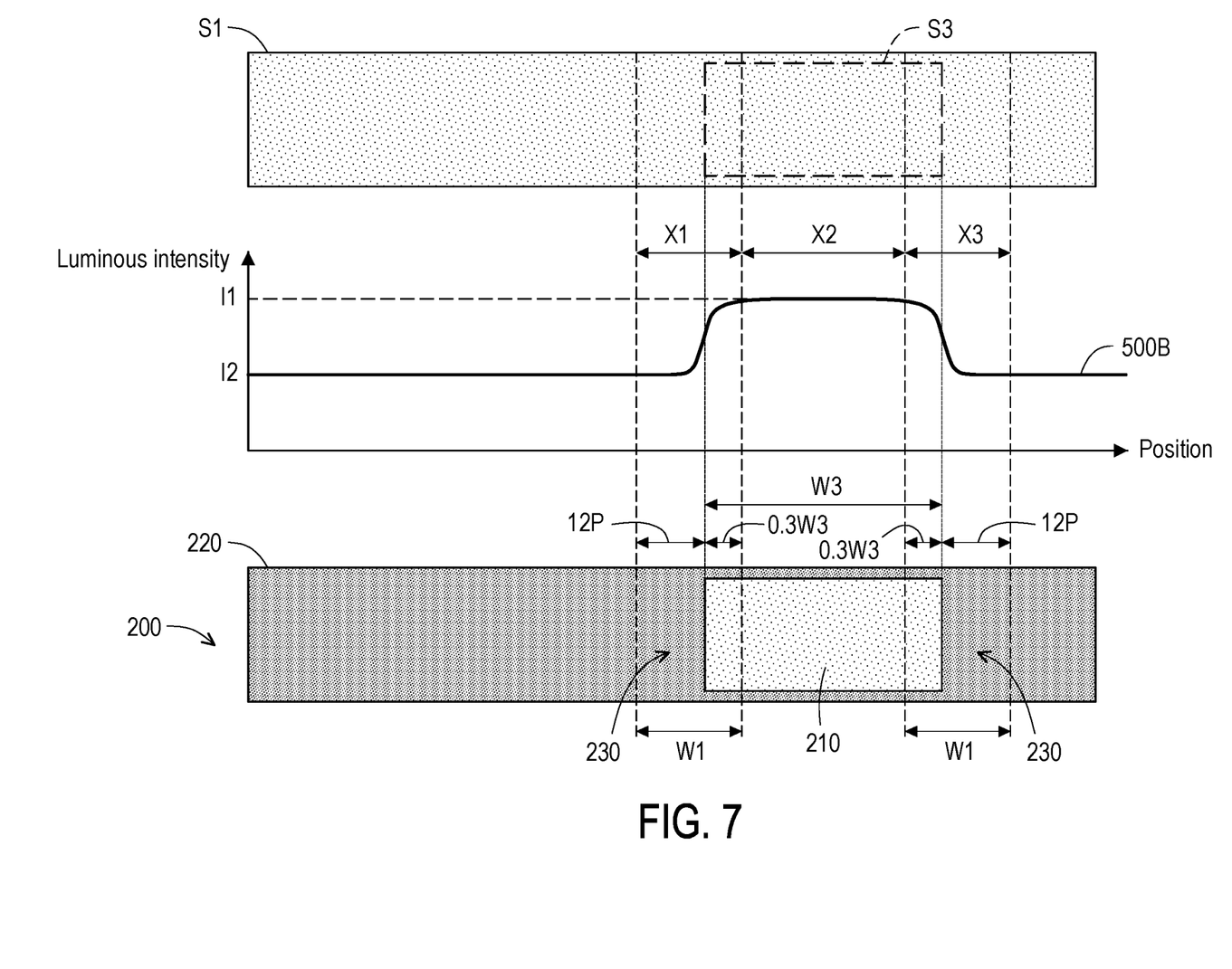
FIG. 7 shows a schematic distribution diagram of a light intensity of a backlight module according to another embodiment of the disclosure.

FIG. 7 shows a schematic distribution diagram of a light intensity of a backlight module according to another embodiment of the disclosure. Please refer to FIG. 2, FIG. 5, and FIG. 7. FIG. 7 shows a schematic distribution diagram of a light intensity of the backlight module 430 in the X direction when the area of the privacy area 220 is larger than the area of the sharing area 210 (as shown in FIG. 2), through modulating the brightness of the light-emitting elements 432 of the partial area 434 of the backlight module 430, the privacy function is realized.

In FIG. 7, the raw content data S1 may include data S3 displayed in the sharing area 210. A curve 500B is a distribution of a light intensity of the backlight module 430 at different positions in the X direction. In this embodiment, through the modulation of the processor circuit 300, the luminous intensity I1 of the backlight module 430 corresponding to the sharing area 210 is greater than the luminous intensity I2 of the backlight module 430 corresponding to the privacy area 220. A change of the luminous intensities of the backlight module 430 in the position ranges X1, X2, and X3 are shown in FIG. 7.

In this embodiment, the width of the junction area 230 is W1, which meets a condition of 2P+0.3W3, in which P is a pitch of the light-emitting element 432 and W3 is a width of the sharing area 210. The unit of the widths W1, W3 and the pitch P are millimeters.

Figure 8:
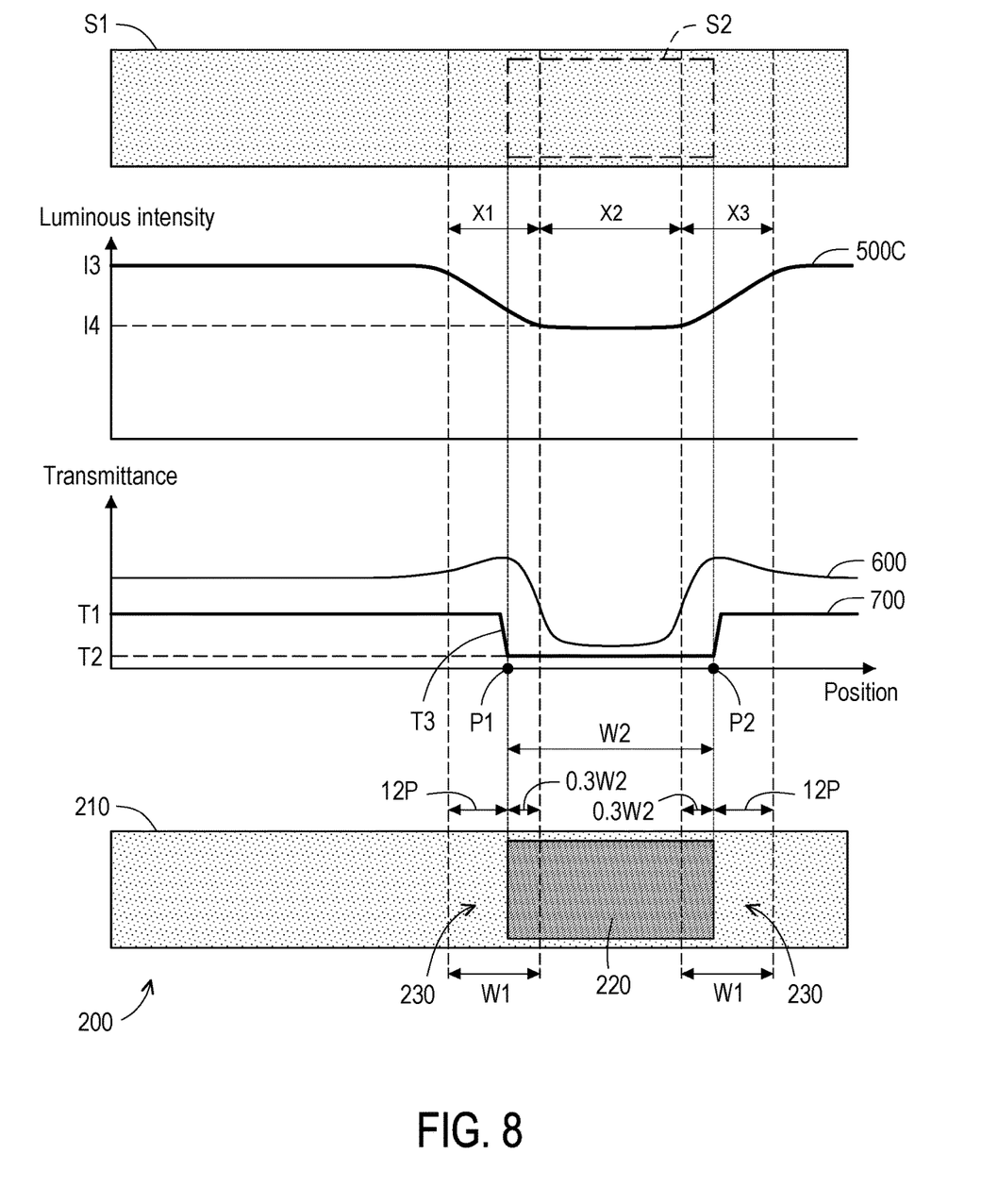
FIG. 8 is a schematic distribution diagram of a light intensity of a backlight module and a transmittance of a privacy panel and a display device according to an embodiment of the disclosure.

FIG. 8 is a schematic distribution diagram of a light intensity of a backlight module and a transmittance of a privacy panel and a display device according to an embodiment of the disclosure. Please refer to FIG. 1, FIG. 5, and FIG. 8. A curve 500C is a distribution of a light intensity of the backlight module 430 at different positions in the X direction. A luminous intensity I3 corresponding to the sharing area 210 of the backlight module 430 is greater than a luminous intensity I4 corresponding to the privacy area 220 of the backlight module 430. A curve 600 is a comprehensive transmittance curve of the display panel 410 and the privacy panel 420 at different positions in the X direction, and a curve 700 is a distribution curve of a transmittance curve of the display device 200, in which the transmittance curve of the display device 200 may be a comprehensive transmittance curve of the display panel 410, the privacy panel 420, and the backlight module 430, and the transmittance corresponding to the privacy area 220 may be 5 to 80% of the transmittance of the sharing area 210.

In this embodiment, the processor circuit 300 may first increase the number of bits of the raw content data S1 by interpolation or table lookup, for example, from 8 bits to 10 bits, so as to improve the fineness of the displayed image. Next, the processor circuit 300 reduces the number of bits corresponding to data S2 of the raw content of the privacy area 220, so as to partially change the position of the privacy area 422 of the privacy panel 420 to activate the privacy function.

In FIG. 8, the change of the transmittance of the display device 200 is shown by the curve 700. A transmittance T1 of the sharing area 210 is greater than a transmittance T3 of the junction area 230, and the transmittance T3 of the junction area 230 is greater than a transmittance T2 of the privacy area 220. The transmittance of the junction area 230 is from the transmittance T1 of the sharing area 210 to the transmittance T2 of the privacy area 220. The change of the transmittance of the display panel 410 and the privacy panel 420 are shown by the curve 600. The processor circuit 300 may, for example, increase the transmittance of the display panel 410 and the privacy panel 420 near positions P1 and P2 by controlling the transmittance of the display panel 410 and the privacy panel 420, so that the change of the transmittance of the display device 200 near the positions P1 and P2 may be steep, as shown by the curve 700 at the positions P1 and P2. Therefore, when the privacy function is activated, the user does not see the poor quality of light and dark in the junction area 230 due to the halo blending of the light-emitting elements, so that the display device 200 can achieve a high-quality optical performance.

Figure 9:
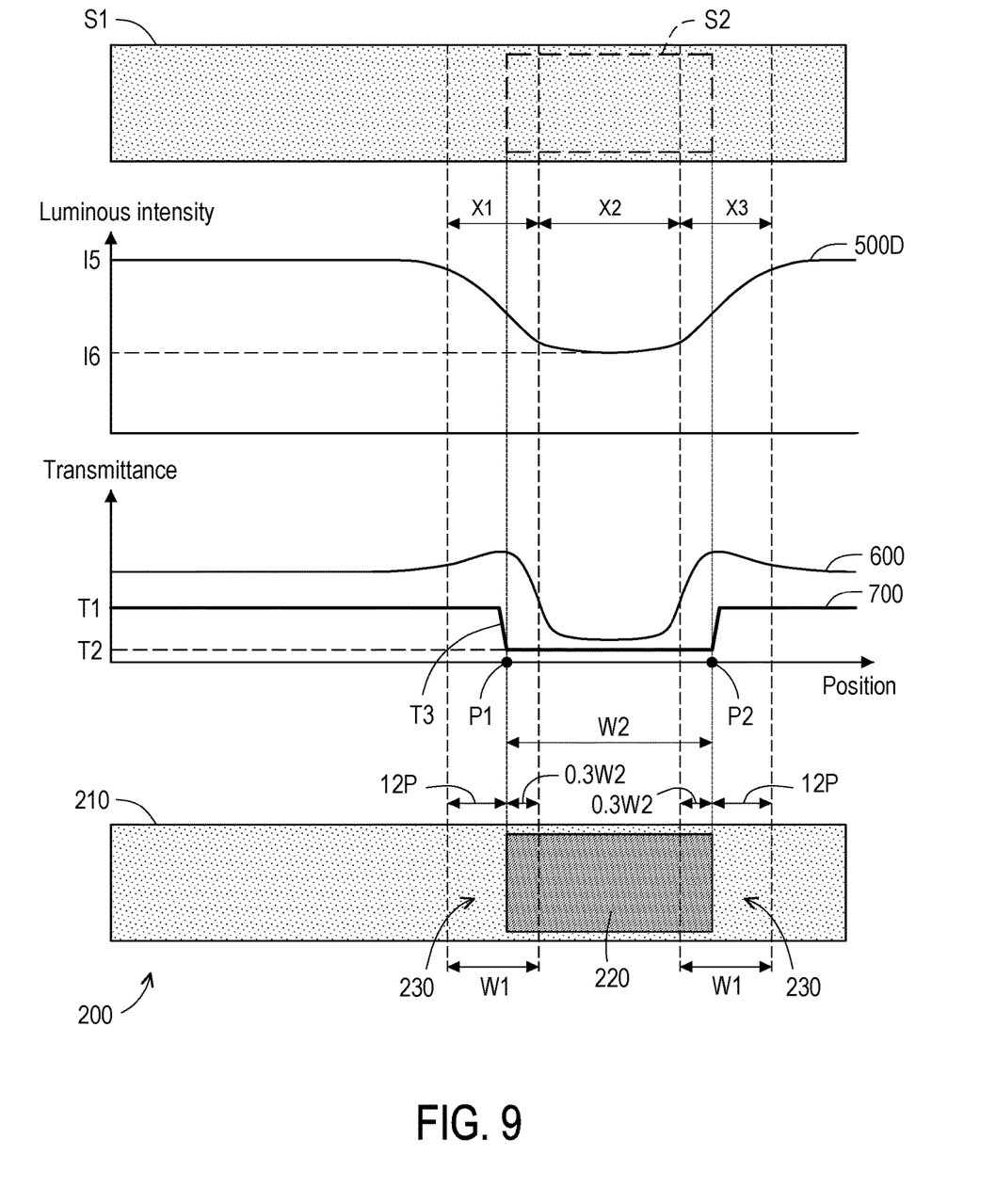
FIG. 9 shows a schematic distribution diagram of a light intensity of a backlight module and a transmittance of a privacy panel and a display device according to another embodiment of the disclosure.

FIG. 9 shows a schematic distribution diagram of a light intensity of a backlight module and a transmittance of a privacy panel and a display device according to another embodiment of the disclosure. Please refer to FIG. 1, FIG. 5, and FIG. 9. A curve 500D is a distribution of a light intensity of the backlight module 430 at different positions in the X direction.

In this embodiment, the processor circuit 300 can further modulate the brightness of the light-emitting element 432 of the partial area 434 in addition to adjusting the transmittance of the display panel 410 and the privacy panel 420. Through the modulation of the processor circuit 300, a luminous intensity 15 of the backlight module 430 corresponding to the sharing area 210 is greater than a luminous intensity 16 of the backlight module 430 corresponding to the privacy area 220, in which the luminous intensity of the backlight module 430 corresponding to the privacy area 220 may be 5 to 80% of the luminous intensity of the sharing area 210.

Therefore, the change of the transmittance of the display device 200 near the positions P1 and P2 may be steep. Therefore, when the privacy function is activated, the user does not see the poor quality of light and dark in the junction area 230 due to the halo blending of the light-emitting elements, so that the display device 200 can achieve a high-quality optical performance.

In summary, in the embodiments of the disclosure, the electronic device has a partial privacy switching function, which can be applied to display panels of various sizes, and can perform optical adjustment (e.g. luminous intensity, transmittance) on the backlight module and/or the display panel and the privacy panel to the corresponding partial privacy area. Also, the privacy effect is optimized through the adjustment and control of the processor circuit, and the problem of the poor quality in the junction area of the partial privacy area and the sharing area is solved. When the privacy function is activated, the user does not see the poor quality of light and dark in the junction area due to the halo blending of the light-emitting elements, so that the display device can achieve a high-quality optical performance.

Finally, it should be noted that the above embodiments are merely used to illustrate the technical solutions of the disclosure, rather than to limit them. Although the disclosure has been described in detail with reference to the above embodiments, persons skilled in the art should understand that the technical solutions described in the above embodiments may still be modified, or equivalent replacements for some or all of the technical features may be performed. However, the modifications or replacements do not make the essence of the corresponding technical solutions depart from the scope of the technical solutions of the embodiments of the disclosure.

What is claimed is:

1. An electronic device, comprising:
   a display device comprising a sharing area, a junction area, and a privacy area, and the junction area is positioned between the sharing area and the privacy area,
   wherein an area of the sharing area is larger than an area of the privacy area, wherein a transmittance of the sharing area is greater than a transmittance of the privacy area.

2. The electronic device according to claim 1, wherein a transmittance of the junction area is between the transmittance of the sharing area and the transmittance of the privacy area.

3. The electronic device according to claim 1, wherein the display device comprises a backlight module, and a luminous intensity of the backlight module corresponding to the sharing area is greater than a luminous intensity of the backlight module corresponding to the privacy area.

4. The electronic device according to claim 3, wherein the backlight module comprises a plurality of light-emitting elements, and a width W1 of the junction area meets a condition of 12P+0.3W2, wherein P is a pitch of the light-emitting elements, and W2 is a width of the privacy area.

5. The electronic device according to claim 3, wherein the backlight module comprises a plurality of light-emitting elements, and a width W1 of the junction area meets a condition of 12P+0.3W3, wherein P is a pitch of the light-emitting elements, and W3 is a width of the sharing area.

6. The electronic device according to claim 1, further comprising:
   a processor circuit, wherein the display device displays an image according to raw content data, and the processor circuit performs an image processing operation on the raw content data to increase the number of bits of the raw content data and reduce the number of bits corresponding to the raw content data of the privacy area.

7. The electronic device according to claim 1, wherein the display device is a display device for a carrier.

8. The electronic device according to claim 7, wherein the carrier is an apparatus capable of carrying people, comprising a vehicle, an airplane, or a ship.

9. An electronic device, comprising:
   a display device, comprising a sharing area, a junction area, and a privacy area, and the junction area is positioned between the sharing area and the privacy area,
   wherein a transmittance of the sharing area is greater than a transmittance of the junction area, and the transmittance of the junction area is greater than a transmittance of the privacy area.

10. The electronic device according to claim 9, wherein the display device comprises a backlight module, the backlight module comprises a plurality of light-emitting elements, and a width W1 of the junction area meets a condition of 12P+0.3W2, wherein P is a pitch of the light-emitting elements, and W2 is a width of the privacy area.

11. The electronic device according to claim 9, wherein the display device comprises a backlight module, the backlight module comprises a plurality of light-emitting elements, and a width W1 of the junction area meets a condition of 12P+0.3W3, wherein P is a pitch of the light-emitting elements, and W3 is a width of the sharing area.

12. The electronic device according to claim 9, wherein the display device is a display device for a carrier.

13. The electronic device according to claim 12, wherein the carrier is an apparatus capable of carrying people, comprising a vehicle, an airplane, or a ship.

14. The electronic device according to claim 9, wherein the privacy area is any area of the display device, and a position and an area size of the privacy area are selectable.

15. A display device, comprising a sharing area, a junction area, and a privacy area, and the junction area is positioned between the sharing area and the privacy area, wherein a transmittance of the sharing area is greater than a transmittance of the junction area, and the transmittance of the junction area is greater than a transmittance of the privacy area.

16. The display device according to claim 15, wherein the display device comprises a backlight module, the backlight module comprises a plurality of light-emitting elements, and a width W1 of the junction area meets a condition of 12P+0.3W2, wherein P is a pitch of the light-emitting elements, and W2 is a width of the privacy area.

17. The display device according to claim 15, wherein the display device comprises a backlight module, the backlight module comprises a plurality of light-emitting elements, and a width W1 of the junction area meets a condition of 12P+0.3W3, wherein P is a pitch of the light-emitting elements, and W3 is a width of the sharing area.

18. The display device according to claim 15, wherein the display device is a display device for a carrier, and the carrier is an apparatus capable of carrying people, comprising a vehicle, an airplane, or a ship.

19. The display device according to claim 15, wherein the privacy area is any area of the display device, and a position and an area size of the privacy area are selectable.

* * * * *